(12) United States Patent
Josien et al.

(10) Patent No.: US 7,033,559 B2
(45) Date of Patent: Apr. 25, 2006

(54) METALLOPHOSPHATE TYPE IM-6 CRYSTALIZED SOLID AND THE PREPARATION METHOD THEREOF

(75) Inventors: Ludovic Josien, Mulhouse (FR); Angélique Simon-Masseron, Brunstatt (FR); Volker Gramlich, Zurich (CH); Joël Patarin, Flaxlanden (FR); Loïc Rouleau, Charly (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 10/508,210

(22) PCT Filed: Mar. 11, 2003

(86) PCT No.: PCT/FR03/00775

§ 371 (c)(1),
(2), (4) Date: Apr. 25, 2005

(87) PCT Pub. No.: WO03/078307

PCT Pub. Date: Sep. 25, 2003

(65) Prior Publication Data

US 2005/0175526 A1 Aug. 11, 2005

(30) Foreign Application Priority Data

Mar. 20, 2002 (FR) .................................. 02 03438

(51) Int. Cl.
*C01B 39/54* (2006.01)

(52) U.S. Cl. ............... 423/305; 423/306; 423/DIG. 30; 502/208; 502/214

(58) Field of Classification Search ............... 423/305, 423/306, DIG. 30; 502/208, 214
See application file for complete search history.

(56) References Cited

U.S. PATENT DOCUMENTS

| | | | | |
|---|---|---|---|---|
| 4,310,440 A | * | 1/1982 | Wilson et al. ............... 502/205 |
| 4,440,871 A | * | 4/1984 | Lok et al. ..................... 502/214 |
| 4,554,143 A | * | 11/1985 | Messina et al. ............. 423/306 |
| 4,793,984 A | * | 12/1988 | Lok et al. ..................... 423/704 |
| 5,385,718 A | * | 1/1995 | Casci et al. .................. 423/718 |
| 5,420,279 A | | 5/1995 | Joly et al. |

(Continued)

FOREIGN PATENT DOCUMENTS

EP 0507657 10/1992

OTHER PUBLICATIONS

Cowley A R et al.; "CGS: Cobalt and Zinc Gallophosphates with a New Open-Framework Topology" Microporous and Mesoporous Materials, Elsevier Science Publishing, New York, US, vol. 28, No. 1, Mar. 1999, pp. 163-172.

(Continued)

*Primary Examiner*—David Sample
(74) *Attorney, Agent, or Firm*—Millen, White, Zelano & Branigan, P.C.

(57) ABSTRACT

The invention relates to a metallophosphate-type crystallized solid, referred to by the name IM-6, which exhibits an X-ray diffraction diagram as given below. This metallophosphate-type solid can be partially substituted by an element X and optionally by an element Y. Said metallophosphate exhibits a chemical composition, expressed on an anhydrous base, defined by the formula $R_S(G_gP_pX_xY_y)O_2$, where G represents one or more trivalent element(s), R represents one or more organic compound(s), X represents one or more divalent element(s), Y represents one or more tetravalent element(s), and in which $s \leq 0.2$, $g \leq 0.5$, $p \leq 0.5$, $x \leq 0.4$, $y \leq 0.3$, with $g+p+x+y=1$.

20 Claims, 1 Drawing Sheet

Figure 1:
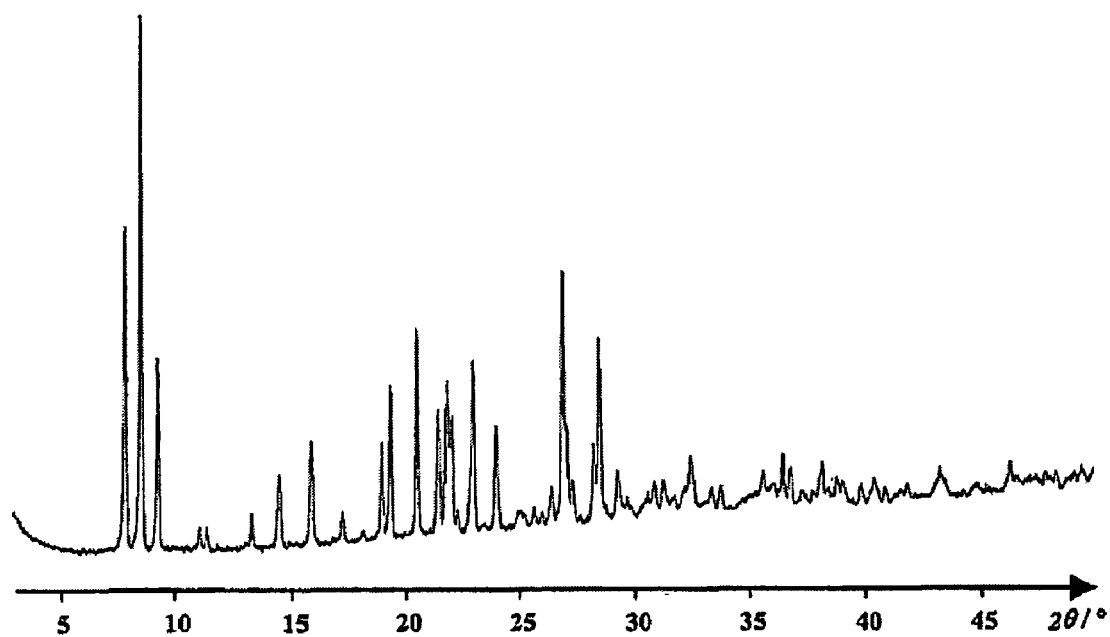

U.S. PATENT DOCUMENTS 5,989,410 A   11/1999   George et al.
6,136,290 A   10/2000   Benazzi et al.
6,306,286 B1  10/2001   Corma et al.

OTHER PUBLICATIONS

Chippindale A M et al.: "Heteroatom-Substituted Microporous Gallium Phosphates" Microporous and Mesoporous Materials, Elsevier Science Publishing, New York, US, vol. 21, No. 4-6, May 1, 1998, pp. 271-279.

Josien, Ludovic et al.: "Synthesis and Crystal Structure of IM-6, A New Open Framework Cobalt-Gallium Phosphate with Ten-and Twelve-Membered Pore Openings" Chemistry—A European Journal (2003) pp. 856-861.

* cited by examiner

METALLOPHOSPHATE TYPE IM-6 CRYSTALIZED SOLID AND THE PREPARATION METHOD THEREOF

The invention relates to a new metallophosphate-type crystallized solid that is called IM-6 solid below and that exhibits a new crystalline structure, and a process for preparation of said IM-6 solid.

The crystallized microporous solids have been known for many years. Essentially two families are found among the latter: the zeolites (crystallized aluminosilicates) and the related metallophosphate-type solids. At the beginning of the 1980's, the first synthesized metallophosphates were aluminophosphates (U.S. Pat. No. 4,310,440). In these compounds, the framework elements and in particular aluminum can be partially substituted by other elements such as silicon (U.S. Pat. No. 4,440,871) or transition metals (M. Hartmann, L. Kevan, *Chem. Rev.*, 1999, 99, 635). These microporous phosphates have ion exchange properties as well as acid catalyst in various chemical reactions. The use of gallium to replace aluminum in the syntheses made it possible to produce microporous gallium phosphates also called gallophosphates (EP-A-0 226 219; U.S. Pat. No. 5,420,279, for example). More recently, other metallophosphates were discovered: the constituent metal of the framework can be in particular zinc, iron, vanadium, nickel, etc. . . (A. K. Cheetham, G. Férey, T. Loiseau, *Angew. Chem. Int.* Ed., 1999, 38, 3268). Like the aluminophosphates, the gallophosphates can be partially substituted by transition metals (P. Feng, X. Bu, G. D. Stucky, *Nature*, 1997, 388, 735) and can thus exhibit ion exchange and acidity properties. Among these substituted gallophosphates, some have zeolite-type structures. Other original zeolite structures such as the structural types CGF (CoGaPO-5) (A. M. Chippindale, A. R. Cowley, *Zeolites*, 1997, 18, 176), CGS (CoGaPO-6) (A. R. Cowley, A. M. Chippindale, *Microporous Mesoporous Mater.*, 1999, 28, 163), SBS (UCSB-6) and SBT (UCSB-10) (X. Bu, P. Feng, G. D. Stucky, *Science*, 1997, 278, 2080) have also been discovered. Most of these substituted gallophosphates were synthesized in an almost non-aqueous medium in the presence of an organic solvent such as ethylene glycol (A. M. Chippindale, A. R. Cowley, *Microporous Mesoporous Mater.* 1998, 21, 271). In a general way, the metallophosphates are usually obtained by hydrothermal or organothermal crystallization of a reaction mixture that comprises a phosphate anion source, generally orthophosphoric acid; a required source of metal, generally an oxide, a carbonate, an ester or an ether of this metal; a structuring agent, in particular an amine, an ammonium cation or a cation of groups IA and IIA, optionally a mobilizing agent, for example the fluoride anion or hydroxyl anion, and a solvent (water or organic solvent).

This invention relates to a new metallophosphate-type crystallized solid, called an IM-6 crystallized solid, that exhibits in its crude synthesis form an X-ray diffraction diagram that includes at least the lines that are recorded in Table 1. This diagram is provided in FIG. 1. This new metallophosphate-type IM-6 crystallized solid exhibits a new crystalline structure.

This diffraction diagram is obtained by radiocrystallographic analysis by means of a diffractometer by using the standard method of powders with radiation $K\alpha_1$ of copper ($\lambda$=1.5406 Å). From the position of the diffraction peaks shown by angle $2\theta$, Bragg's equation is used to calculate the reticular equidistances $d_{hkl}$ that are characteristic of the sample. The estimation of the measurement error $\Delta(d_{hkl})$ to $d_{hkl}$ is calculated by Bragg's equation based on absolute error $\Delta(2\theta)$ that is assigned to the measurement of $2\theta$. An absolute error $\Delta(2\theta)$ that is equal to $\pm 0.2°$ is commonly allowed. Relative intensity Ire that is assigned to each value of $d_{hkl}$ is measured according to the corresponding diffraction peak height. The X-ray diffraction diagram of the IM-6 crystallized solid according to the invention comprises at least the lines with values of $d_{hkl}$ provided in Table 1. In the column of $d_{hkl}$, the mean values of the inter-reticular distances are indicated in angstroms (Å). Each of these values should be assigned the error of measurement $\Delta(d_{hkl})$ that is between +0.2 Å and ±0.008 Å.

TABLE 1

Mean values of $d_{hkl}$ and relative intensities measured on an X-ray diffraction diagram of the IM-6 crystallized solid of the invention

| $d_{hkl}$ (Å) | 2θ (degrees) | I/I₀ |
|---|---|---|
| 11.1 ± 0.2 | 7.95 | F |
| 10.2 | 8.65 | FF |
| 9.4 | 9.39 | mf |
| 7.95 ± 0.05 | 11.12 | f |
| 7.72 | 11.45 | f |
| 6.61 | 13.39 | f |
| 6.06 | 14.60 | f |
| 5.55 | 15.96 | mf |
| 5.10 | 17.38 | f |
| 4.86 | 18.25 | f |
| 4.70 | 18.87 | f |
| 4.65 | 19.07 | mf |
| 4.56 | 19.44 | mf |
| 4.31 | 20.60 | m |
| 4.12 | 21.54 | mf |
| 4.05 | 21.94 | mf |
| 4.02 | 22.11 | mf |
| 3.969 ± 0.008 | 22.38 | f |
| 3.871 | 22.96 | mf |
| 3.857 | 23.04 | mf |
| 3.786 | 23.48 | f |
| 3.699 | 24.04 | mf |
| 3.553 | 25.04 | f |
| 3.534 | 25.17 | f |
| 3.517 | 25.31 | f |
| 3.458 | 25.75 | f |
| 3.415 | 26.07 | f |
| 3.357 | 26.53 | f |
| 3.303 | 26.98 | m |
| 3.282 | 27.15 | mf |
| 3.252 | 27.40 | f |
| 3.142 | 28.38 | mf |
| 3.117 | 28.62 | m |
| 3.089 | 28.88 | f |
| 3.036 | 29.39 | f |
| 2.995 | 29.81 | f |
| 2.909 | 30.71 | f |
| 2.883 | 30.99 | f |
| 2.847 | 31.40 | f |
| 2.810 | 31.82 | f |
| 2.767 | 32.33 | f |
| 2.747 | 32.58 | mf |
| 2.677 | 33.45 | f |
| 2.646 | 33.85 | f |
| 2.511 | 35.72 | f |
| 2.480 | 36.19 | f |
| 2.457 | 36.55 | mf |
| 2.435 | 36.89 | mf |
| 2.401 | 37.43 | f |
| 2.371 | 37.91 | f |
| 2.352 | 38.24 | mf |
| 2.338 | 38.48 | f |
| 2.314 | 38.90 | f |
| 2.300 | 39.13 | f |
| 2.257 | 39.92 | f |
| 2.236 | 40.30 | f |
| 2.225 | 40.51 | f |
| 2.201 | 40.97 | f |
| 2.154 | 41.92 | f |
| 2.139 | 42.21 | f |

TABLE 1-continued

Mean values of $d_{hkl}$ and relative intensities measured on an X-ray diffraction diagram of the IM-6 crystallized solid of the invention

| $d_{hkl}$ (Å) | 2θ (degrees) | I/I$_0$ |
|---|---|---|
| 2.087 | 43.33 | f |
| 2.077 | 43.55 | f |
| 1.956 | 46.39 | mf |
| 1.913 | 47.49 | f |
| 1.896 | 47.96 | f |
| 1.881 | 48.35 | f |
| 1.851 | 49.19 | f |
| 1.839 | 49.52 | f | where FF = very strong; m = medium; f = weak; F = strong; mf = medium-weak; ff = very weak.

Relative intensity I/I$_o$ is provided relative to a relative intensity scale where it is attributed to a value of 100 at the most intense line of the RX diffraction diagram: ff<15; 15≦f<30; 30≦mf<50; 50≦m<65; 65≦F<85; FF≧85.

The metallophosphate-type IM-6 crystallized solid is preferably a gallophosphate.

According to a preferred embodiment of the invention, the constituent metal of the crystalline framework of the metallophosphate-type IM-6 solid is partially substituted by one or more chemical element(s) of different nature. Said substituted metallophosphate exhibits, in its crude synthesis form, a chemical composition, expressed on an anhydrous base, defined by the following general formula: $R_s$ ($G_g$P$_p$X$_x$Y$_y$) O$_2$ (I), where G represents one or more trivalent element(s), R represents one or more organic compound(s), X represents one or more divalent element(s), and Y represents one or more tetravalent element(s). In formula (I), g, s, p, x and y represent the numbers of moles of each of elements G, R, P, X and Y for two moles of oxygen atoms, and their values are such that s is less than or equal to 0.2, g is less than or equal to 0.5, p is less than or equal to 0.5, x is less than or equal to 0.4, and y is less than or equal to 0.3, with g+p+x+y=1. Preferably, s is between 0.06 and 0.17; g is between 0.2 and 0.4; p is between 0.4 and 0.5; x is between 0.1 and 0.3; and y is between 0 and 0.1; and even more preferably, y is between 0.01 and 0.1.

The partially substituted metallophosphate, in its crude synthesis form, exhibits a crystalline structure that provides an X-ray diffraction diagram that is similar to the one provided by the IM-6 crystalline structure (FIG. 1) and that includes at least the same lines as those recorded in Table 1. Insignificant differences possibly can be observed relative to mean values $d_{hkl}$ and to relative intensities I/I$_o$, provided in Table 1 because of the nature and the amount of elements G, X, Y or R that are present in the solid.

According to this embodiment of the invention in which the IM-6 crystallized solid is a partially substituted metallophosphate, G is preferably selected from among the elements of group IIIA of the periodic table, and preferably selected from among boron, aluminum, gallium, and the mixture of at least two of these elements. G is preferably aluminum and/or gallium. Very preferably, G is gallium. Element G advantageously adopts the tetrahedral coordination in the IM-6 crystallized solid. Element X is preferably selected from among the metals encompassed in the group that consists of cobalt, zinc, manganese, copper, nickel, magnesium and the mixture of at least two of these metals. Very preferably, element X is cobalt. Element X advantageously adopts the tetrahedral coordination in the IM-6 crystallized solid. Element Y is preferably selected from among silicon, germanium, titanium and the mixture of at least two of these elements. Very preferably, element Y is silicon. A very preferred composition of the IM-6 crystallized solid according to the invention is such that it comprises cobalt, phosphorus and gallium. Element R, representing one or more organic compound(s), can be the organic structurant that is used during the preparation of the IM-6 crystallized solid, such as is described later in this description. In general, element R is an amine. In particular, it may be a cyclic amine and preferably an alkylpiperazine. R is preferably 1,4-dimethylpiperazine, 1-ethylpiperazine, 1-methylpiperazine or its precursors or its decomposition products.

The new crystalline structure of the metallophosphate-type or substituted metallophosphate-type IM-6 crystallized solid according to the invention is a three-dimensional structure, formed by tetrahedrons. In the case where the metallophosphate is substituted, said three-dimensional structure is formed by an assembly of tetrahedral patterns TO$_4$ with T=X, Y, G, P and consists of cycles with 4 and 6 elements T (T=X, Y, G, P). The metallophosphate-type or substituted metallophosphate-type IM-6 crystallized solid according to the invention contains a two-dimensional system with ducts oriented in the directions [0–11] and [100]. These two types of ducts are delimited by openings with 10 and 12 elements T respectively.

Under its crude synthesis form, said metallophosphate-type or substituted metallophosphate-type IM-6 crystallized solid according to the invention contains, occluded in said ducts, the proton-containing organic structurant that is used during the synthesis. This organic structurant compensates for the negative charge of the framework, as well as a certain amount of hydrating water. The dehydration of said crude synthesis solid, by heating up to about 180° C., does not in general cause the removal of the organic structurant. The organic structurant can be eliminated by standard methods known from the prior art, such as chemical and/or heat treatments. In the case of a heat treatment of the crude synthesis form, the temperature is in general higher than 400° C. and preferably between 450° C. and 550° C. After heat treatment, the solid that is obtained contains organic structurant in a much smaller amount than in the crude synthesis solid, to the extent that the organic structurant is eliminated for the most part. After heat treatment, the solid that is obtained preferably no longer contains organic structurant.

The invention also relates to the synthesis process of the IM-6 crystallized solid. The metallophosphate-type IM-6 crystallized solid according to the invention is obtained by hydrothermal or organothermal crystallization of a reaction mixture that comprises a phosphate anion source, generally orthophosphoric acid, a required source of metal, preferably a gallium source, generally in the form of an oxide, a carbonate, an ester or an ether of this metal, a structuring agent, in particular an amine, an ammonium cation or a cation of groups IA and IIA, optionally a mobilizing agent, for example the fluoride anion or hydroxyl anion, and a solvent (water or organic solvent). More specifically, the process consists in preparing a reaction mixture that is called a gel and that contains one or more hydroxylated organic solvents such as ethylene glycol or glycerol, one or more phosphorus source(s), one or more source(s) of element G, one or more source(s) of element X, optionally one or more source(s) of element Y, and one or more source(s) of element R selected from among the organic structurants, preferably the nitrogen-containing organic structurants, their precursors and their decomposition products. Said gel optionally contains water. The amounts of said reagents are adjusted so as to impart to this gel a composition that makes possible its crystallization into IM-6 crystallized solid of formula $R_s(G_gP_pX_xY_y)O_2$, where R, G, X and Y and s, g, p, x and y correspond to criteria defined above. Then, the gel is subjected to hydrothermal treatment until the IM-6 crystallized solid forms. The gel is advantageously put under hydrothermal conditions, at a temperature that is lower than 200° C., preferably between 100 and 200° C., and even more preferably between 150 and 200° C., and under a pressure that is at least equal to the autogenous pressure of the mixture that consists of said gel, during a sufficient period for the formation of the IM-6 crystallized solid that imprisons the organic structurant in these ducts. The heating of the gel is preferably carried out in an autoclave, and the crystallization can be performed with or without stirring. The period that is necessary to obtain crystallization depends on the composition of the gel, in particular the addition of nuclei, the stirring and the heating temperature. This period is generally between 1 and 20 days, and preferably between 2 and 17 days. When the crystallization is completed, the solid is separated from the mother liquors by centrifuging or by filtration, then washed with demineralized water, dried, modified by heat treatments and/or chemical treatments, so as to eliminate the organic structurant, and shaped according to the methods of one skilled in the art. Said organic structurant can be eliminated according to the standard methods that are known from the prior art, described above.

Advantageously, the molar composition of the gel is such that:

| | |
|---|---|
| $P_2O_5$ | 0.25–4 |
| $G_2O_3$ | 0.05–4 |
| XO | 0.5–8 |
| $YO_2$ | 0–4 |
| R | 0.5–8 |
| $H_2O$ | <50 |
| Solvent (ethylene glycol, . . . ) | 10–1000 |

Still more advantageously, the molar composition of the gel is such that:

| | |
|---|---|
| $P_2O_5$ | 0.5–1.5 |
| $G_2O_3$ | 0.5–2 |
| XO | 1–3 |
| $YO_2$ | 0–2 |
| R | 1–3 |
| $H_2O$ | <20 |
| Solvent (ethylene glycol, . . . ) | 25–100 |

The most appropriate phosphorus source is concentrated orthophosphoric acid, but its salts and esters, such as the alkaline phosphates, the reactive phosphates of trivalent element G, and in particular the gallium phosphates, and the alkyl phosphates, are also suitable.

The source of element G is advantageously selected from among the oxides, oxyhydroxides, hydroxides or alkoxides of this element. The salts of element G, in particular chloride, nitrate, and sulfate, are also appropriate. It is also possible to use a common source for elements G and P such as a gallophosphate. The gallium oxyhydroxide is used preferably when element G is gallium.

The source of metal X is advantageously selected from among the salts, for example carbonate, chloride, nitrate, sulfate, acetate, hydroxides, oxides and alkoxides. The carbonate, and in particular the cobalt carbonate when element X is cobalt, is preferably used.

The source of element Y can be any compound that comprises element Y and that can release this element in aqueous solution in reactive form. Advantageously, when element Y is silicon, it is a silica, in particular a silica sol, combustion silica, precipitated silica, or a silicon alkoxide. A combustion silica suspension is preferably used.

It is also advantageous to add nuclei to the reaction mixture so as to reduce the time that is necessary for the formation of the IM-6 crystallized solid according to the invention, to promote its formation to the detriment of impurities or to control the size of the crystals. Such nuclei comprise crystallized solids, in particular crystals that have the structure of the IM-6 solid according to the invention. The crystalline nuclei are generally added in a proportion of between 0.01 and 10% by weight of the phosphate of element G that is used in the reaction mixture.

The metallophosphate-type or substituted metallophosphate-type IM-6 crystallized solid according to the invention can be advantageous for various applications, in particular as a catalytic element or an adsorbent element in refining and in petrochemistry.

The invention is illustrated by the following examples that are provided in a nonlimiting way.

EXAMPLE 1

Synthesis of a Co-Substituted Gallophosphate Compound with an IM-6 Structure 0.56 g of hydrated gallium oxyhydroxide (GaOOH.xH$_2$O containing about 9% by mass of water) and 0.64 g of hydrated cobalt carbonate (containing 7% by mass of water; Aldrich) are put in suspension in 7.70 g of ethylene glycol (SDS). The gallium oxyhydroxide is obtained by evaporation of a gallium nitrate solution on a sand bank at a temperature of 250° C. for 24 hours. While being stirred, 0.58 g of orthophosphoric acid at 85% (Labosi) and then 0.25 g of N-methylpiperazine (Aldrich) after 10 minutes of stirring are added. The thus formed reaction medium, having the consistency of a gel, is cured while being stirred for a period that is equal to about 1 hour.

The molar composition of the gel (thus prepared reaction medium, expressed in terms of oxide and relative to 1 mol of $P_2O_5$) is as follows:

1 Ga$_2$O$_3$: 2 Co(CO$_3$)$_2$: 1 P$_2$O$_5$: 4H$_2$O: 1 N-methylpiperazine: 50 ethylene glycol The reaction mixture is transferred into a steel autoclave that is equipped with a 20 cm$^3$ polytetrafluoroethylene (PTFE) jacket and then is heated without being stirred to 180° C. for a period that is equal to 8 days to form a crystallized product. After cooling, the crystallized solid that is obtained is washed with demineralized water and then subjected to sonication for a period of several minutes. After drying at 60° C., a blue powder that constitutes the crystallized solid of IM-6 structure is obtained. The chemical analysis of the solid leads to the following formula [(C$_5$H$_{12}$N$_2$)$_{0.1}$Ga$_{0.3}$P$_{0.5}$CO$_{0.2}$]O$_2$•0.1H$_2$O (or Ga$_3$CO$_2$P$_5$O$_{20}$(C$_5$H$_{12}$N$_2$)•H$_2$O). The values of d$_{hkl}$ of the lines of the X-ray diffraction diagram of this product correspond to the values of Table 1 and to the diffractogram that is shown in FIG. 1. This diffractogram can be indexed in triclinic symmetry (P-1 space group) with the following mesh parameters: a=9.850(20)Å; b=12.473(32)Å; c=12.612(28)Å; α=63.52(16)°; β=74.54(16)°; γ=76.03(17)°.

EXAMPLE 2

Synthesis of a Co-Substituted Gallophosphate Compound with an IM-6 Structure The procedure is performed as in Example 1, but the nitrogen-containing organic structurant 1-methylpiperazine is replaced by 1,4-dimethylpiperazine in the same molar proportions. After reaction, the solid that is obtained consists of blue crystals. The X-ray diffractogram of this crystallized solid is identical to the one that is described in Table 1 of this description. The chemical analysis of the solid leads to the following formula

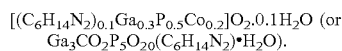

$[(C_6H_{14}N_2)_{0.1}Ga_{0.3}P_{0.5}Co_{0.2}]O_2 \cdot 0.1H_2O$ (or $Ga_3Co_2P_5O_{20}(C_6H_{14}N_2) \cdot H_2O$).

EXAMPLE 3

Synthesis of a Co-Substituted Gallophosphate Compound with an IM-6 Structure The procedure is performed as in Example 1, but the nitrogen-containing organic structurant 1-methylpiperazine is replaced by 1-ethylpiperazine in the same molar proportions. After reaction, the solid that is obtained consists of blue crystals. The X-ray diffractogram of this crystallized solid is identical to the one that is described in Table 1 of this description. The chemical analysis of the solid leads to the following formula $[(C_6H_{14}N_2)_{0.1}Ga_{0.3}P_{0.5}Co_{0.2}]O_2 \cdot 0.1H_2O$ (or $Ga_3Co_2P_5O_{20}(C_6H_{14}N_2) \cdot H_2O$).

EXAMPLE 4

Synthesis of a Co-Substituted Gallophosphate Compound with an IM-6 Structure The procedure is performed as in Example 1, but the gallium source, the hydrated gallium oxyhydroxide ($GaOOH \cdot xH_2O$) is replaced by gallium oxide $\beta$-$Ga_2O_3$ in the same molar proportions. After reaction, the solid that is obtained consists of blue crystals. The X-ray diffractogram of this crystallized solid is identical to the one that is described in Table 1 of this description. A reduction of the crystallinity of the synthesized solid in this example should be noted, however, relative to the one of Example 1. The chemical analysis of the solid leads to the following formula

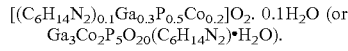

$[(C_5H_{12}N_2)_{0.1}Ga_{0.3}P_{0.5}Co_{0.2}]O_2 \cdot 0.1H_2O$ (or $Ga_3Co_2P_5O_{20}(C_5H_{12}N_2) \cdot H_2O$).

EXAMPLE 5

Synthesis of a Co-Substituted Gallophosphate Compound with an IM-6 Structure The procedure is performed as in Example 1, but the phosphorus source, the orthophosphoric acid, is replaced by triethylphosphate in the same molar proportions. After reaction, the solid that is obtained consists of blue crystals. The X-ray diffractogram of this crystallized solid is identical to the one that is described in Table 1 of this description. It is necessary, however, to note a reduction of the crystallinity of the synthesized solid in this example relative to the one of Example 1. The chemical analysis of the solid leads to the following formula

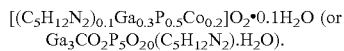

$[(C_5H_{12}N_2)_{0.1}Ga_{0.3}P_{0.5}Co_{0.2}]O_2 \cdot 0.1H_2O$ (or $Ga_3Co_2P_5O_{20}(C_5H_{12}N_2) \cdot H_2O$).

EXAMPLE 6

Synthesis of a Co-Substituted Gallophosphate Compound with an IM-6 Structure In this preparation, the synthesis method of Example 1 is used with a hydrothermal treatment carried out at 150° C. After reaction, a little blue solid that consists of crystals is obtained. The X-ray diffractogram of this solid is identical to the one that is described in Table 1 of this description. A reduction of the crystallinity of synthesized solid in this example should be noted, however, relative to that of Example 1. At this temperature, it is necessary to extend the synthesis time up to 17 days to obtain a better yield of IM-6 phase. The chemical analysis of the solid leads to the following formula $[(C_5H_{12}N_2)_{0.1}Ga_{0.3}P_{0.5}Co_{0.2}]O_2 \cdot 0.1H_2O$ (or $Ga_3Co_2P_5O_{20}(C_5H_{12}N_2) \cdot H_2O$).

EXAMPLE 7

Synthesis of a Co- and Si-Substituted Gallophosphate Compound with an IM-6 Structure The procedure is performed as in Example 1, and a powdered silica source (Cab-O-Sil M-5 Fumed Silica) is added, after introduction of the cobalt carbonate, to the suspension in the glycol. The silica is used in the same molar proportions as the amine. After reaction, the solid that is obtained consists of blue crystals. The X-ray diffractogram of this crystallized solid is identical to the one that is described in Table 1 of this description. The X-cartography study of the silicon shows a homogeneous dispersion of this element in the crystals.

EXAMPLE 8

Synthesis of a Co-Substituted Gallophosphate Compound with an IM-6 Structure The procedure is performed as in Example 2, and a nuclei source is introduced at the end of the one-hour curing period. The crystalline nuclei consist of solid crystals with finely ground solid crystals with an IM-6-structure. They are added in a proportion of about 1% by weight of gallium phosphate that is used in the reaction mixture. Thanks to the nuclei, the synthesis period can be reduced. Actually, from the first day of synthesis, solid crystals with an IM-6 structure are observed. It is preferable, however, to wait for 2 days of synthesis to have a high yield of crystals.

After reaction, the solid that is obtained consists of blue crystals. The X-ray diffractogram of this crystallized solid is identical to the one that is described in Table 1 of this description. The chemical analysis of the solid leads to the following formula:

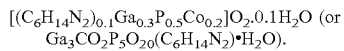

$[(C_6H_{14}N_2)_{0.1}Ga_{0.3}P_{0.5}Co_{0.2}]O_2 \cdot 0.1H_2O$ (or $Ga_3Co_2P_5O_{20}(C_6H_{14}N_2) \cdot H_2O$).

The invention claimed is:

1. A metallophosphate-type IM-6 crystallized solid, in its crude synthesis form, an X-ray diffraction pattern including at least the lines given in the table below:

| $d_{hkl}$ (Å) | 2θ (degrees) | $I/I_0$ | $d_{hkl}$ (Å) | 2θ (degrees) | $I/I_0$ |
|---|---|---|---|---|---|
| 11.1 ± 0.2 | 7.95 | F | 3.036 | 29.39 | f |
| 10.2 | 8.65 | FF | 2.995 | 29.81 | f |
| 9.4 | 9.39 | mf | 2.909 | 30.71 | f |
| 7.95 ± 0.05 | 11.12 | f | 2.883 | 30.99 | f |
| 7.72 | 11.45 | f | 2.847 | 31.40 | f |
| 6.61 | 13.39 | f | 2.810 | 31.82 | f |
| 6.06 | 14.60 | f | 2.767 | 32.33 | f |
| 5.55 | 15.96 | mf | 2.747 | 32.58 | mf |
| 5.10 | 17.38 | f | 2.677 | 33.45 | f |
| 4.86 | 18.25 | f | 2.646 | 33.85 | f |
| 4.70 | 18.87 | f | 2.511 | 35.72 | f |
| 4.65 | 19.07 | mf | 2.480 | 36.19 | f |
| 4.56 | 19.44 | mf | 2.457 | 36.55 | mf |
| 4.31 | 20.60 | m | 2.435 | 36.89 | mf |
| 4.12 | 21.54 | mf | 2.401 | 37.43 | f |
| 4.05 | 21.94 | mf | 2.371 | 37.91 | f |
| 4.02 | 22.11 | mf | 2.352 | 38.24 | mf |
| 3.969 ± 0.008 | 22.38 | f | 2.338 | 38.48 | f |
| 3.871 | 22.96 | mf | 2.314 | 38.90 | f |
| 3.857 | 23.04 | mf | 2.300 | 39.13 | f |
| 3.786 | 23.48 | f | 2.257 | 39.92 | f |
| 3.699 | 24.04 | mf | 2.236 | 40.30 | f |
| 3.553 | 25.04 | f | 2.225 | 40.51 | f |
| 3.534 | 25.17 | f | 2.201 | 40.97 | f |
| 3.517 | 25.31 | f | 2.154 | 41.92 | f |
| 3.458 | 25.75 | f | 2.139 | 42.21 | f |
| 3.415 | 26.07 | f | 2.087 | 43.33 | f |
| 3.357 | 26.53 | f | 2.077 | 43.55 | f |
| 3.303 | 26.98 | m | 1.956 | 46.39 | mf |
| 3.282 | 27.15 | mf | 1.913 | 47.49 | f |
| 3.252 | 27.40 | f | 1.896 | 47.96 | f |
| 3.141 | 28.38 | mf | 1.881 | 48.35 | f |
| 3.117 | 28.62 | m | 1.851 | 49.19 | f |
| 3.089 | 28.88 | f | 1.839 | 49.52 | f | where FF = very strong; F = strong; m = medium; mf = medium-weak; f = weak; ff = very weak.

2. AN IM-6 crystallized solid according to claim 1, wherein the metallophosphate is a gallophosphate.

3. An IM-6 crystallized solid according to claim 1 or claim 2, having a chemical formula, in its as synthesized form expressed as the anhydrous form, defined by the general formula $R_s(G_gP_pX_xY_y)O_2$, in which G represents one or more trivalent element(s), R represents one or more organic component(s), X represents one or more divalent element(s), Y represents one or more tetravalent element(s), and in which $s \leq 0.2, g \leq 0.5, p \leq 0.5, x \leq 0.4, y \leq 0.3$, with $g+p+x+y=1$.

4. An IM-6 crystalline solid according to claim 3, wherein element G is gallium.

5. An IM-6 crystalline solid according to claim 4 wherein the element Y is at least one element selected from the group consisting of silicon, germanium, and titanium.

6. An IM-6 crystalized solid according to claim 4 wherein element R is an amine.

7. An IM-6 crystalline solid according to claim 4 wherein the element X is at least one metal selected from the group consisting of by cobalt, zinc, manganese, copper, nickel, and magnesium.

8. An IM-6 crystalline solid according to claim 7 wherein the element Y is at least one element selected from the group consisting of silicon, germanium, and titanium.

9. An IM-6 crystallized solid according to claim 8 wherein element R is an amine.

10. An IM-6 crystalline solid according to claim 3 wherein the element X is at least one metal selected from the group consisting of by cobalt, zinc, manganese, copper, nickel, and magnesium.

11. An IM-6 crystalline solid according to claim 10 wherein the element Y is at least one element selected from the group consisting of silicon, germanium, and titanium.

12. An IM-6 crystalline solid according to claim 3 wherein the element Y is at least one element selected from the group consisting of silicon, germanium, and titanium.

13. An IM-6 crystallized solid according to claim 3 wherein element R is an amine.

14. An IM-6 crystalline solid according to claim 13, wherein element R is an alkylpiperazine.

15. An IM-6 crystalline solid according to claim 3, comprising cobalt, gallium and phosphorus.

16. An IM-6 crystallized solid according to claim 15 wherein element R is an amine.

17. An IM-6 crystalline solid according to claim 16, wherein element R is an alkylpiperazme.

18. A process for preparing an IM-6 crystalline solid according to claim 3 comprising of mixing one of more source(s) of phosphorus, one or more source(s) of the element G, one or more source(s) of element X, optionally one or more source(s) of element Y, one or more sources of the element R selected from organic structuring agents, their precursors and their decomposition products, one or more hydroxylated organic solvent(s) then carrying out a hydrothermal treatment of said mixture until said IM-6 crystalline solid is formed.

19. A preparation according to claim 18, wherein the molar composition of the reaction mixture is:

| | |
|---|---|
| $P_2O_5$ | 0.25–4 |
| $G_2O_3$ | 0.05–4 |
| XO | 0.5–8 |
| $YO_2$ | 0–4 |
| R | 0.5–8 |
| $H_2O$ | <50 |
| Solvent | 10–1000. |

20. A process according to claim 18, in which seeds are added to the reaction mixture.

* * * * *

UNITED STATES PATENT AND TRADEMARK OFFICE
CERTIFICATE OF CORRECTION

PATENT NO. : 7,033,559 B2
APPLICATION NO. : 10/508210
DATED : April 25, 2006
INVENTOR(S) : Ludovic Josien et al.

Page 1 of 1

It is certified that error appears in the above-identified patent and that said Letters Patent is hereby corrected as shown below:

On the Title page, item [54] and col. 1, line 1 Title: line 2, reads "CRYSTALIZED" should read -- CRYSTALLIZED --
Column 9, line 40, reads "AN IM-6" should read -- An IM-6 --
Column 10, line 3, reads "consisting of by" should read -- consisting of --
Column 10, line 13, reads "consisting of by" should read -- consisting of --
Column 10, line 31, reads "alkylpiperazme." should read -- alkylpiperazine. --
Column 10, line 33, reads "comprising of mixing one of more" should read -- comprising mixing one or more --
Column 10, line 39, reads "solvent(s) then" should read -- solvent(s), then --

Signed and Sealed this

Twenty-ninth Day of August, 2006

JON W. DUDAS
*Director of the United States Patent and Trademark Office*